INVENTOR
PETER ANIS
BY
ATTORNEY

United States Patent Office 3,548,281
Patented Dec. 15, 1970

3,548,281
ELECTRICAL CONTROL ARRANGEMENT FOR CONTROLLING THE MOVEMENT OF A MACHINE PART
Peter Anis, Bad Hersfeld, Germany, assignor to Zuse KG, Bad Hersfeld, Germany
Filed Feb. 5, 1969, Ser. No. 796,842
Claims priority, application Germany, Feb. 9, 1968, 1,638,173
Int. Cl. G05b *19/18*
U.S. Cl. 318—569　　　　　　　　　　　　　　12 Claims

ABSTRACT OF THE DISCLOSURE

The movement of a machine part along a path is controlled by step motors simultaneously moving the part in a first and second direction causing the vector sum of the movements to coincide with the path. A pulse generator generates a pulse sequence which is divided into two pulse sequences having individually adjustable frequencies, each of which is applied to one of said step motors. The motors are operated at maximum synchronous speed, so that the speed must be decreased for changes in direction exceeding a determined value or when the motors are to be stopped. Circuits are supplied to furnish signals for causing such a deceleration under determined conditions, thus eliminating the need for including provision for such deceleration in the program controlling the overall operation of the system.

BACKGROUND OF THE INVENTION

This invention relates to an electrical control arrangement for the control of the movement of a component part of a machine, such as for example the movement of a machine tool relative to a workpiece, the movement of a stylus of a plotter relative to the recording paper, or even the motion of a light beam relative to photosensitive paper. In particular, it relates to such control arrangements when step motors are used as transport means and the overall system works under the control of data input signals.

In a known arrangement (as described in U.S. Patent 3,190,139), a component part of a machine is moved along a determined path by simultaneous movement in two coordinate directions, such that the resultant movement is along a programmed path. The coordinates of the desired starting points and end points of a particular section of the path, as well as the desired velocity at the beginning and at the end, is stored in coded form on a punched tape. In this known arrangement, sections of the path which take place along a relatively straight line are carried out at a high velocity, while sections of the path having a larger curvatures are covered with a diminished velocity, so that the actual path of the part follows relatively closely to the desired path while maintaining a relatively high average velocity, of, for example, the tool, relative to the workpiece. This known arrangement has the disadvantage that a great deal of time and material is necessary to program the desired velocity values, to store these on suitable data carriers, to decode the relevant data, to derive the control signals therefrom and, finally, to effect the desired control as a function of said control signals.

Such program arrangements often make use of step motors for transporting the component part. These step motors are driven by a series of pulses, or transport signals, for each of which the output shaft is advanced by a definite incremental angle. These step motors have the characteristic that they can only start and stop in synchronism with the input signals in the lowest quarter of their total velocity range. Thus, for starting and stopping, these motors can only be driven at very low frequencies (start-stop frequencies) of the transport signals or pulses. In the specification below, the maximum frequency at which correct starting and stopping in accordance with input signals can be achieved will be called the maximum start-stop frequency. If the input pulse repetition frequency of the transport signals is larger than the maximum start-stop frequency, the output of the step motors will not correctly follow the transport signals, but may otherwise operate in synchronism with the frequency of the transport signals. The highest transport signal frequency for which a synchronous control of the motor is still possible will be designated as maximum synchronous frequency hereinafter. For a transport signal frequency above the maximum start-stop frequency, the rotor of a step motor remains in synchronism with the transport signal frequency, the rotor of the motor trailing the rotating field. The angle between the rotor and the rotating field increases with increasing frequency and may, depending on the quality of the motor, encompass a plurality of steps. For the movement of component parts of machines in accordance with a program, it is of course desirable to drive the step motors not only with the maximum start-stop frequency, but with the maximum synchronous frequency. This of course results in difficulties when correct starting and stopping in accordance with input data is required to maintain the accuracy of the system.

SUMMARY OF THE INVENTION

It is an object of this invention to furnish an arrangement for the control of component parts of a machine which, under control of input data signals, will follow a path described by such signals with the greatest possible accuracy at the highest possible average velocity, while still requiring a minimum of programming.

The invention comprises a control arrangement for automatically controlling the movement of a component part of a machine from a first point to a second point in response to data input signals specifying the path between said points. It comprises first and second transport means for moving said component part simultaneously in a first and second direction respectively, the vector sum of the two so-imparted motions corresponding to said path, each of said transport means being adapted to move said component part for a determined incremental distance in response to a transport signal. Further, each of said transport means require a determined stopping time interval for stopping after operation at a given speed. Transport signal generating means generate a first and second sequence of transport signals for application to said first and second transport means respectively, in such a manner that application of a speed control signal causes simultaneous variation of the frequency $f_1$ and $f_2$ of said first and second sequence respectively, keeping the ratio $f_1/f_2$ constant.

Means are provided for generating a first and second present position signal, corresponding to the present position of said component part in said first and second direction respectively. Finally, circuit means are provided for generating said speed control signal as a function of said data input signals and said present position signals, said circuit means including logic circuit means having a characteristic adjusted to correspond to said determined stopping time interval for controlling the generation of said speed control signal as a function of said determined stopping time interval.

It will be noted that in accordance with the present invention the speed is adjusted without programming by logic circuit means which in turn cause a signal to be generated which simultaneously affects the frequency $f_1$ and $f_2$. The direction of motion is changed by changing the ratio $f_1/f_2$. It should be noted that in accordance with the present invention individual adjustments of $f_1$ and $f_2$ are possible.

The invention is suitable for control of the tools in a machine, relative to the workpiece. It is suitable for the control of the motion of the stylus relative to recording paper as well as to the controlling of the path of light beam relative to photosensitive paper by means of two mirrors.

In a preferred embodiment of the invention, the step motors are driven at the maximum synchronous frequency as much as possible. Differences between the present position signals, and the values of the end points of a particular portion of the travel as furnished by the data input signals, are used to control the generation of a speed control signal which, for example, causes the deceleration of the motor when the number of steps for achieving the desired coordinates of the said end points is less than the number of steps required for stopping the motor synchronously after operation at said top synchronous speed. Thus, the system is switched automatically and in due time to the maximum start-stop frequency.

In a further feature of the invention, the step motors are driven with maximum synchronous frequency as long as this is permissible because the predetermined path does not include sudden changes in direction. Such sudden changes in direction are taken into account by computing means which compute the difference between the slope of the current travel portion, to the slope of the subsequent portion as furnished by the data input signals. Additional logic circuit means then furnish an angle control signal if the change in slope exceeds a predetermined value as required by the characteristics of the particular motors used.

It should be noted that it is a great advantage of this invention that the various speed changes are carried out without use of data input signals, and rather by logic circuits which are once adjusted for the motors used and then can be used automatically for carrying out a program which need only contain start and stop signals and the coordinates of points along the path. Thus, a great deal of programming effort can be saved which was previously essential, as well as the necessity for decoding such program signals and translating them into actual control signals.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
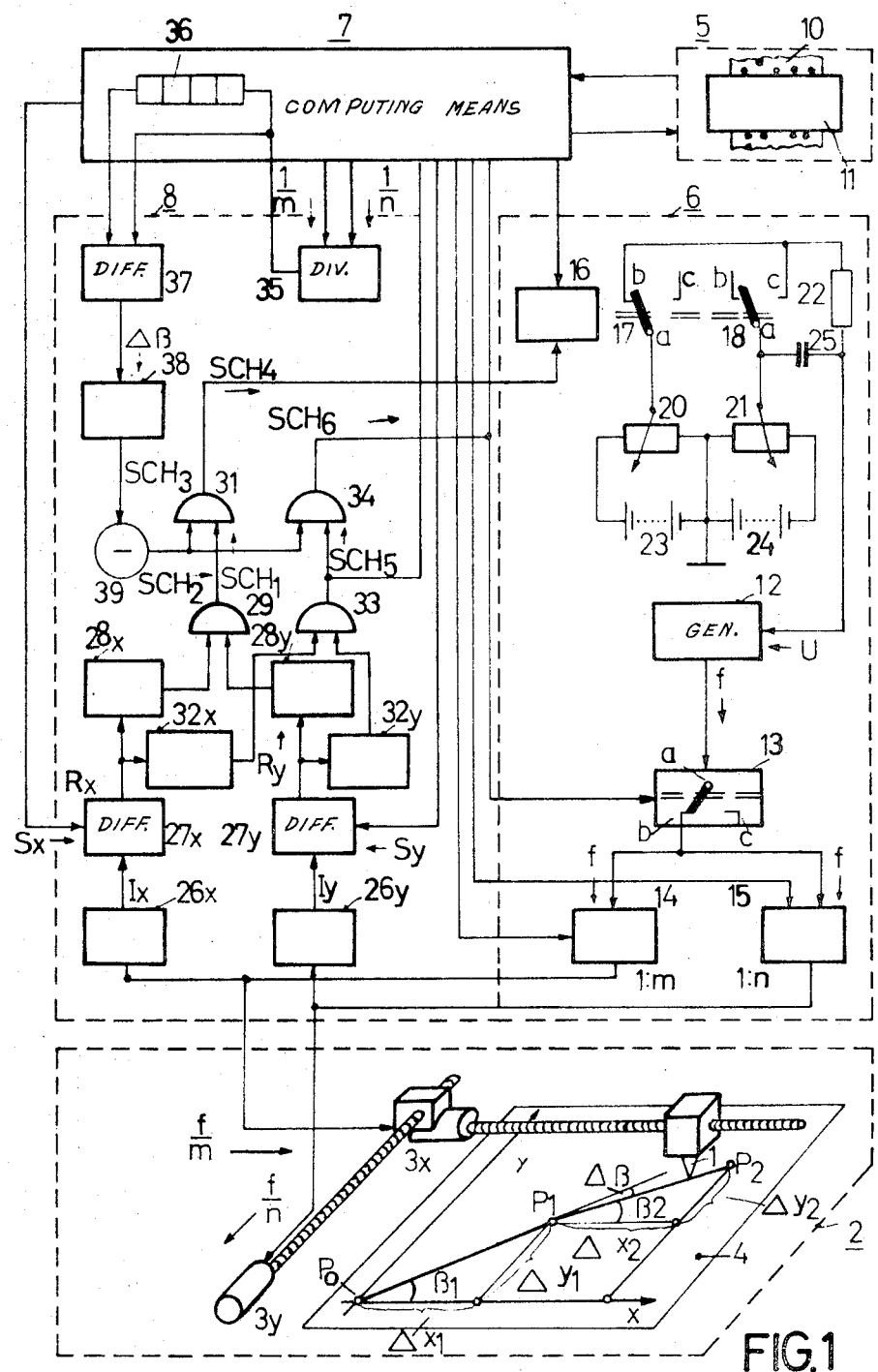
FIG. 1 is a schematic diagram showing an electrical control arrangement for controlling the motion of a stylus in a plotter.

FIG. 1 shows a control arrangement for controlling the motion of the stylus 1 of a plotter 2. For this particular arrangement the component part is to be considered the part of the plotter holding the stylus. The first and second transport means, here step motors $3_x$ and $3_y$ are adapted respectively to move the stylus in the direction of $x$ and $y$, thus causing a line to be entered upon the paper 4 which connects the first point $P_0$ to a second point $P_1$ and then to a third point $P_2$. The coordinates of these points are furnished via data input signals, in this case derived from a punched tape 10 which is scanned by scanning means 11. The data signals on the tape 10 are of course in coded form. Besides the coordinates of the various points, they may contain start and stop signals. The data input signals derived therefrom are fed to computing means 7 and stored therein. Of course the data input signals may be furnished by other means, such as for example a magnetic tape. Transport signal generating means are denoted by reference numeral 6. These are adapted to generate two sequences of transport signals, in this case pulses having a repetition frequency $f_1$ and $f_2$ respectively. One of these frequencies ($f_1$ or $f_2$) and the frequency ratio ($f_1/f_2$) may be adjusted independently. This is accomplished as follows. Base frequency generating means 12 generate a pulse sequence of frequencies $f$. These are furnished to individual adjustment means namely first and second frequency divider means, 14, and 15, via a switch 13, when said switch is in the position shown. The output of these frequency divider means constitute the first and second sequence of transport signals respectively. Thus the frequency $f_1$ is equal to $f/m$, while the frequency $f_2$ is equal to $f/n$, where $m$ and $n$ are the frequency dividing ratios of the two frequency dividers respectively. Reference to the figure will show that these two ratios are each individually adjustable by signals generated from the computing means. The two transport signal sequences are applied to step motors $3_x$ and $3_y$ respectively. Since both of the step motors move simultaneously, the resultant motion will be equal to a vector addition of the two motions. Thus the resulting movement of the pen relative to the paper will be at an angle $\beta$ to the first, or $x$ direction determined by the frequency ratio $n/m$. Thus the frequency ratio $(n/m)_1$, $(n/m)_2$ ... result in a line being entered on the paper having an angle with the $x$ direction of $\beta_1$ and $\beta_2$ etc. Thus the line connecting the points $P_0$ and $P_1$ are at an angle $\beta_1$ determined by the frequency ratio $(n/m)_1$. This ratio $n/m$ of the frequencies thus is dependent solely on the divider ratio $n$ and $m$ and is independent of the base frequency $f$. As long as the frequency divider ratios are not changed in dependence on signals furnished by computing means 7, the same ratio $(n/m)$ remains set so that the corresponding angle $\beta$ remains unchanged and the stylus moves along a straight line. Changing of the divider ratios $1/m$ and $1/n$ causes changes in the angle $\beta$ and thus changes the direction of motion of the component part 1 relative to the $x$ and $y$ axes, while changing of the base frequency $f$ results in changes in the writing velocity. The maximum writing speed at which the motors $3_x$ and $3_y$ may be driven and still stop upon receipt of a stop signal is the start-stop frequency. It is desirable to drive the motors $3_x$ and $3_y$ at a higher speed than said start-stop frequency whenever the frequency divider ratios remain constant over a reasonably long time; that is when no rapid acceleration or deceleration takes place.

Figure 2:
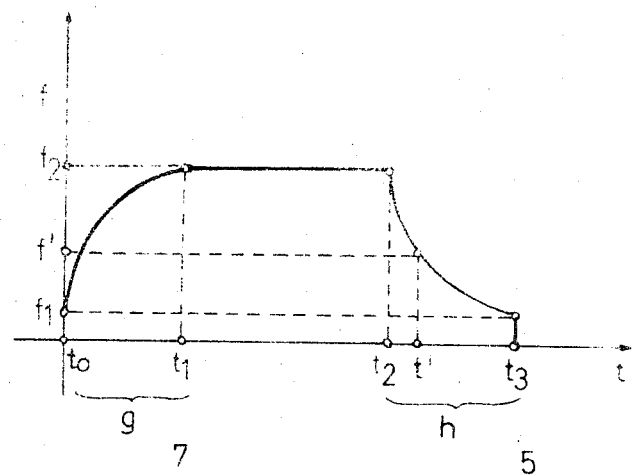
FIG. 2 is a diagram showing the variation of frequency of the transport signals with respect to time.

FIG. 2 shows the variation with time of the base frequency $f$. The time $t$ is marked along the abscissa, while the ordinate has values of base frequency $f$. In particular, the maximum start-stop frequency is the frequency denoted by $f_1$, while the maximum synchronous frequency is denoted by $f_2$. Another synchronous frequency is denoted by $f'$. The diagram of FIG. 2 is based on the assumption that starting with time $t_0$ operation at the maximum synchronous frequency $f_2$ is desired in as short a time period as possible. The base frequency $f$ is therefore increased in accordance with a logarithmic function, until the maximum synchronous frequency $f_2$ is reached at time $t_1$. It is further assumed that starting at a time period $t_3$ the plotter is to come to a stop upon receipt of a stop signal. Thus, the determined stopping time interval of the motor, here denoted by $h$, shows that the maximum synchronous frequency $f_2$ must be decreased to the start-stop frequency $f_1$ starting at time $t_2$. Then, at time $t_3$, the maximum start-stop frequency $f_1$ will have been reached. The shape of the curve starting at time $t_2$ is also an $e$ function. Thus in FIG. 2, $h$ represents the determined stopping time interval of the particular motor used, while the time period from $t_0$ to $t_1$, denoted by a $g$, represents a corresponding starting time interval required for the motor to reach its maximum synchronous speed. It is of course also possible that the intervals $g$ and $h$ be given in terms of the number of transport signals generated during this time interval as well as by the actual time interval.

In order to achieve the curve shown in FIG. 2, a speed control voltage, or speed control signal, denoted by U in FIG. 1 is applied to the base frequency generating means. The speed control signal or voltage U is generated by a circuit including voltage supply means 23 and 24, integrator circuit means including resistors 20, 21, and 22, as well as capacitor 25 and, finally, supply voltage switching means including switches 17 and 18 operated under the control of a switching stage 16. The switches 17 and 18 may be embodied in semi-conductor elements, as for example, transistors. When the switches are in position $b$, the contacts $a$ and $b$ are conductively connected and a relatively high voltage is applied via resistors 20 and 22 to the input of the base frequency generator 12 which thus generates a pulse sequence having the maximum synchronous frequency $f_2$. This condition corresponds to the portion of the curve shown in FIG. 2 starting at $t_1$ and continuing until $t_2$. When the switch is on position $c$, the contacts $a$ and $c$ are conductively connected so that a relatively low speed control voltage is applied from voltage supply means 24 over resistor 21, switch 18, and resistor 22 to the input of the base frequency generator 12, thus causing the maximum start-stop frequency $x_1$ to be generated. The frequency of the transport signal sequences which are generated in response to the change in voltage from the first above-named switch position to the second follows a logarithmic curve because of the resistor 22 and capacitor 25 which constitute an integrator circuit. If the transition is from the switch position $c$ to the switch position $b$, the increase in voltage U causes a corresponding increase in the frequency of the generated transport signal sequence $f$, during time $t_0-t_1$ (FIG. 2), while the transition from the switch position $b$ to the switch position $c$ causes a decrease in the speed control voltage U and a corresponding decrease in the frequency of the transport signal sequence $f$ during time $t_2$ to time $t_3$ (FIG. 2). By means of computing means 7, and circuit means 8, the data input signals are utilized and in conjunction with the determined stopping time or determined starting time, $t_3-t_2$ or $t_1-t_0$, respectively of the step motors $3_x$ and $3_y$, a switching signal $Sch_1$ is generated which causes a change in the base frequency $f$, which is the pulse repetition frequency of the transport signals before these are divided into two sequences by frequency divider means 14 and 15.

The first and second pulse sequences of frequency $f_1$ and $f_2$ respectively are furnished not only to the motors $3_x$ and $3_y$, but also to counters $26_x$ and $26_y$ respectively. These counters count both forward and backward and generate present position signals corresponding to the present position $I_x$ and $I_y$ in the form of pulse combinations (for example, corresponding to the value of the present position expressed in a binary representation). Computing means 7 furnish desired values $S_x$ and $S_y$ corresponding to the coordinates which constitute the end points of the then current portion of travel also in the form of binary coded representations and these are furnished to comparator means, namely a difference stage $27_x$ and $27_y$ respectively. The output of these difference stages corresponds to the distance that the component part still has to travel before reaching the desired end point. These two signals are designated $R_x$ and $R_y$ in FIG. 1 and constitute comparator output signals.

The following assumptions may first be made. First, the coordinates of the starting point $P_0$ and the coordinates of the second points $P_1$ are assumed to be already stored in computing means 7. It is further assumed that a relatively large number of incremental distances or steps of at least one of the step motors $3_x$ or $3_y$ is required to reach point $P_1$ from point $P_0$. It is further assumed that both counters $26_x$ and $26_y$ generate present position signals corresponding to the coordinates of the point $P_0$ and that there are switching positions $c$ of switches 17 and 18 in which the maximum start-stop frequency $f_1$ is generated. The frequency divider ratio for frequency dividers 14 and 15 respectively are set to correspond to the quantities $\Delta y_1$ and $\Delta x_1$ which determine the angle $\beta_1$, as shown in FIG. 1. This adjustment of the frequency divider ratios is accomplished by the computing means 7. Switch 13 is then moved to a position $b$ so that the pulse sequence generated by base frequency generating means 12 is applied to the frequency divider means 14 and 15 respectively. Simultaneously with the switching of switch 13, position $c$ to position $b$ at time $t_0$ (FIG. 2), the switches 17 and 18 assume the position $b$ under control of the switching stage 16, thus causing an increase in the frequency $f$ starting with the maximum start-stop frequency $f_1$ and reaching the maximum synchronous frequency $f_2$ at time $t_1$. To obtain the highest possible operating speed for the plotter, it is of course desirable that at least one of the step motors $3_x$ or $3_y$ is driven at the maximum synchronous frequency $f_2$ for the maximum possible time. Thus, under consideration of the determined stopping interval $h$ (FIG. 2), the time period $t_2$ is computed at which it becomes necessary to lower the maximum synchronous frequency $f_2$ in order to be able to stop the step motors at time $t_3$. In order to accomplish this, the comparator output signals $R_x$ and $R_y$ are respectively applied to threshold stages $28_x$ and $28_y$. These threshold stages each generate a signal only when the corresponding signal $R_x$ or $R_y$ is less than the threshold value to which stage is adjusted. If both threshold stages $28_x$ and $28_y$ generate a signal, then AND gate 29 generates the signal $Sch_1$ which is applied to AND gate 31. If the other input to this AND gate 31 receives its signal $Sch_2$, then AND gate 31 generates the signal $Sch_4$ which controls switching stage 16. The signal $Sch_4$ thus causes the switching stage 16 to switch switches 17 and 18 from position $b$ to position $c$. The threshold values of the threshold stages $28_x$ and $28_y$ are adjusted in such a manner that the switching takes place at time $t_2$. Because of this switching, the frequency $f$ is decreased so that the stopping of the motion is possible at time $t_3$.

The comparator output signals $R_x$ and $R_y$ respectively are also applied to further threshold stages $32_x$ and $32_y$ which generate an output signal only when the comparator output signal signifies a difference between the desired position and the present position which is smaller than a determined tolerance, for example 0. If both of these threshold stages $32_x$ and $32_y$ generate an output signal, then AND gate 33 generates a signal $Sch_5$ which is applied to AND gate 34. If signal $Sch_2$ is present, then AND gate 34 generates signal $Sch_6$ which is applied to switch 13 and switches it to position $c$, so that no further transport signals can reach the step motors $3_x$ and $3_y$. Thus the stylus 1 has reached its desired position within the desired tolerance. The signal $Sch_5$ is also applied to the computing means 7, where it indicates that the stylus 1 has reached a determined point, for example the point $P_1$, thus requiring a new setting of the frequency divider means in order to follow the determined path to the next point, for example point $P_2$. Further, the new desired values $S_x$ and $S_y$ corresponding to point $P_2$ are furnished to the comparator means $27_x$ and $27_y$, while the switches 13, 17 and 18 are switched to positions $b$.

If the number of steps from point $P_0$ to point $P_1$ is smaller than the number of steps $h$ (see FIG. 2) as determined by the setting of threshold stages $27_x$ and $27_y$, then the signal $Sch_1$ is generated immediately, causing switches 17 and 18 to assume the position $c$.

Up to now it was assumed that the stylus is supposed to stop at point $P_1$ and that the signal $Sch_2$ was furnished to AND gates 31 and 34. It will now be assumed that the stylus is to proceed from point $P_0$ to point $P_1$ to point $P_2$ without stopping at $P_1$. Under these conditions, the switching signal $Sch_4$ is generated only when the stylus 1 must be stopped because of an excessive change of direction.

Computing means 7 and circuit means 8 now have the function to compare the directions from the point $P_0$ to the point $P_1$ to that from point $P_1$ to point $P_2$ and to allow the steps motors $3_x$ and $3_y$ to operate at the maximum possible frequencies $f_1$ and $f_2$ respectively as long as the relative angle $\Delta\beta$, which signifies the difference between the angles $\beta_1$ and $\beta_2$ signifying the slopes of the directions from $P_0$ to $P_1$ and from $P_1$ to $P_2$ respectively (see FIG. 1) is less than a predetermined threshold value $\Delta\beta$. Furthermore, the frequency of the transport signal sequences is to be decreased in time if this threshold value $\Delta\beta$ is exceeded. In order to accomplish this task, the ratio $n/m=\beta_1$ is computed in the divider stage 35 and stored in register 36. While the stylus is travelling from point $P_0$ to point $P_1$, the frequency ratio $n/m=\beta_2$ is computed in the divider stage 35 and applied to a second comparator stage 37. This comparator computes the difference $\Delta\beta$, since its second input receives the frequency ratio $n/m=\Delta\beta_1$ from register 36. The value $\Delta\beta$ is applied to threshold stage 38. This threshold stage 38 generates a signal $Sch_3$ when the difference $\Delta\beta$ is less than the threshold value $\Delta\beta'$ to which this stage has been adjusted. The signal $Sch_3$ is applied to a NOT gate 39, whose output furnishes the signal $Sch_2$ to AND gates 31 and 32. Stage 38 and gate 39 together constitute additional logic circuit means. Signal $Sch_2$ constitutes an angle control signal. Thus the output signals from AND gates 31 and 34 are always suppressed when the threshold value $\Delta\beta'$ has not been reached. Thus for relatively small values of $\Delta\beta$, a decrease of the transport signal sequence frequency from the maximum synchronist frequency $f_2$ is prevented. Thus switches 13, 17 and 18 are not switched from position $b$ to position $c$ if the difference $\Delta\beta$ is smaller than the threshold value $\Delta\beta'$. If the stylus is to stop at point $P_1$, the signal $Sch_3$ is suppressed thus allowing the AND gates 31 and 34 to generate an output signal.

At times it may be desirable to let the pulse frequency $f$ of the base frequency generating means depend upon $\Delta\beta$. If this $\Delta\beta$ is relatively large, then the base frequency $f'$ should be relatively small (at the most equal to the maximum start-stop frequency $f_1$). If the amount $\Delta\beta$ is relatively small, then the base frequency $f'$ should be relatively large. In this manner, the determined path is followed more or less rapidly for smaller and larger values $\Delta\beta$ respectively.

Figure 3:
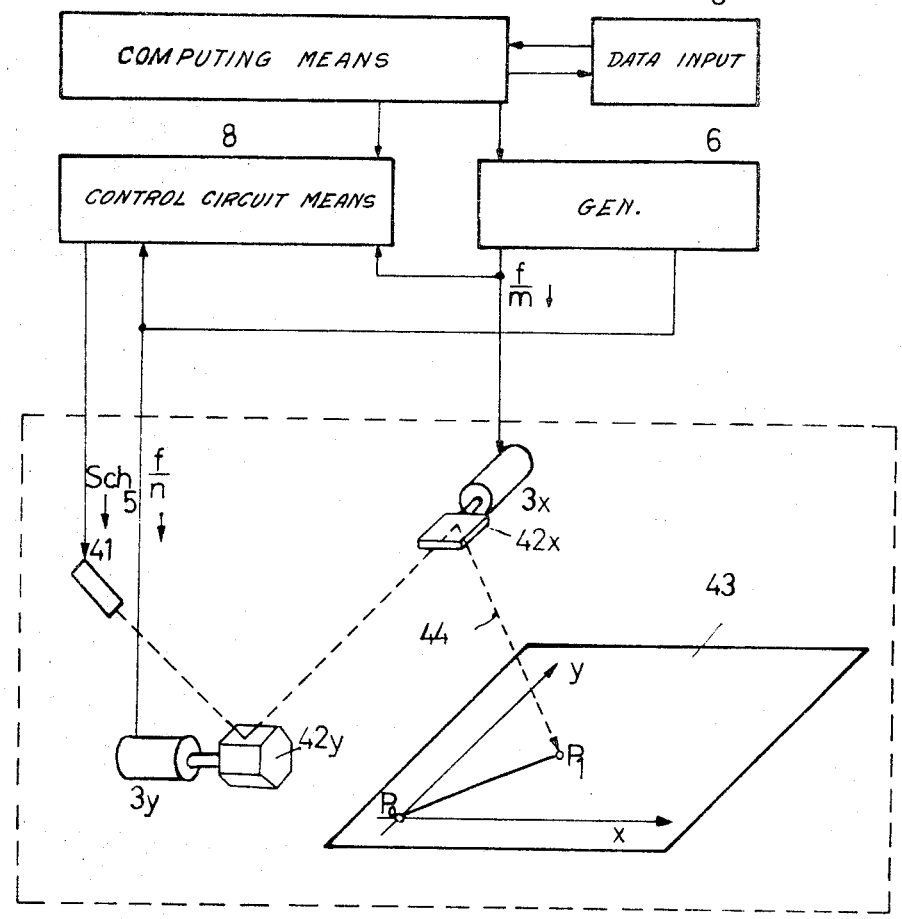
FIG. 3 is an electrical control arrangement for controlling the motion of a light beam by means of two mirrors which effect the path of the light relative to photosensitive material.

FIG. 3 shows an arrangement which differs from that of FIG. 1 only in that in this particular case the component part is the light beam generated by a light source 41 and moved by means of mirrors $42_x$ and $42_y$ relative to the photosensitive material 43. It is thus the beam and not a stylus which follows the determined path. The step motors $3_x$ and $3_y$ are controlled as in FIG. 1. If signals from the threshold stages $32_x$ and $32_y$ (see FIG. 1) indicate that the beam has reached the desired position within the determined tolerances, then the AND gate 33 generate signal $Sch_5$ which terminates the light from the light source 41.

While the invention has been illustrated and described as embodied in a control arrangement using threshold stages, it is not intended to be limited to the details shown, since various modifications and circuit changes may be made without departing in any way from the spirit of the present invention.

What is claimed as new and desired to be protected by Letters Patent is set forth in the appended claims:

1. Control arrangement for automatically controlling the movement of a compound part of a machine from a first point to a second point in response to data input signals specifying the path between said points, comprising, in combination, first and second transport means for moving said component part in a first and second direction respectively, the vector sum of the two so-imparted motions corresponding to said path, each of said transport means being adapted to move said component part for a determined incremental distance in response to a transport signal, each of said transport means requiring a determined stopping time interval for stopping after operation at a given speed; transport signal generating means for generating a first and second sequence of transport signals for application to said first and second transport means, respectively, said first and second sequence of transport signals having a first and second frequency, respectively, said transport signal generating means having a control input, a speed control signal applied at said control input causing simultaneous variation of said first and second frequency in such a manner that the ratio of said frequencies remains constant; means for generating a first and second present position signal, corresponding to the present position of said component part in said first and second direction respectively; and circuit means for generating said speed control signal as a function of said data input signals and said present position signals, said circuit means including logic circuit means having a characteristic adjusted to correspond to said determined stopping time interval for controlling the generation of said speed control signal as a function of said determined stopping time interval.

2. A control arrangement as set forth in claim 1 also comprising first and second individual adjustment means for individually adjusting the frequency $f_1$ and $f_2$ respectively.

3. A control arrangement as set forth in claim 2, wherein said transport signal generating means comprise base frequency generating means having a base frequency output signal; and first and second frequency divider means for furnishing said first and second sequence of transport signals respectively.

4. A control arrangement as set forth in claim 3, wherein said first and second individual adjustment means comprise means for changing the ratio of said first and second frequency divider means respectively.

5. A control arrangement as set forth in claim 4, further comprising switching means for terminating said first and second sequence of transport signals under control of said data input signals.

6. A control arrangement as set forth in claim 5, wherein the frequency of said base frequency output signal is a function of the voltage applied to said base frequency generating means; and wherein the voltage applied to said base frequency generating means comprises said speed control signal.

7. A control arrangement as set forth in claim 6, wherein said determined stopping time interval corresponds to a determined number of said incremental distances when said simultaneous variation of the frequency $f_1$ and $f_2$ is a determined variation with respect to time; wherein said data input signals comprise second point coordinate signals signifying the coordinate of said second point; wherein said circuit means further comprise comparator means for comparing said second point coordinate signals each with the corresponding present position signal and generating comparator output signals as a function of the differences therebetween; wherein said logic circuit means comprise threshold circuits, having a threshold value adjusted to correspond to said determined stopping time interval; and means for applying said comparator output signals each to a corresponding threshold circuit in such a manner that a corresponding threshold output signal is generated when a comparator output signal is less than the threshold value to which the threshold circuit is adjusted.

8. A control arrangement as set forth in claim 7 also comprising supply voltage adjustment means for individually adjusting said first and second value of voltage.

9. A control arrangement as set forth in claim 6, wherein said circuit means for generating said speed control signal comprises integrator circuit means having an integrator circuit output voltage, said integrator circuit output voltage constituting the voltage applied to said base frequency generating means; voltage supply means connected to said integrator circuit means; and supply voltage switching means for alternatively supplying a first and second value of voltage from said voltage supply means to said integrator circuit means at least in part under control of said threshold output signal.

10. A control arrangement as set forth in claim 8, wherein said path between said first point and said second point is a straight line having a determined angle to said first direction; wherein said transport continues from said second point to a third point along a straight line having a second determined angle to said first direction; said control arrangement further comprising computing means for computing an angle difference signal corresponding to the difference between said first and second determined angles; and additional logic circuit means for generating an angle control signal when said angle difference signal exceeds a determined angular value.

11. A control arrangement as set forth in claim 10, wherein said supply voltage switching means is operated under control of said angle control signal and said threshold output signal.

12. A control arrangement as set forth in claim 7, wherein said component part is a light beam; wherein said first and second transport means comprise first and second motor driven mirrors; also comprising additional threshold circuits for comparing said comparator output signals to additional determined threshold values, and generating a signal for terminating said light beam when said comparator output signals are less than the corresponding second determined threshold values.

References Cited

UNITED STATES PATENTS

| | | | |
|---|---|---|---|
| 3,267,344 | 8/1966 | McDaniel | 318—28X |
| 3,418,548 | 12/1968 | Raphael | 318—18 |
| 3,461,365 | 8/1969 | Newland et al. | 318—28X |

BENJAMIN DOBECK, Primary Examiner

U.S. Cl. X.R.

318—573, 685